(12) United States Patent
Levitan et al.

(10) Patent No.: US 10,637,530 B1
(45) Date of Patent: Apr. 28, 2020

(54) SPACE TIME FREQUENCY MULTIPLEXING (STFM) FOR RADAR SYSTEMS USING COMPLEMENTARY PAIR WAVEFORMS

(71) Applicant: QUALCOMM Incorporated, San Diego, CA (US)

(72) Inventors: Evgeny Levitan, Haifa (IL); Evyatar Hemo, Kiryat Bialik (IL); Simha Sorin, Zoran (IL); Ariel Yaakov Sagi, Haifa (IL)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/440,934

(22) Filed: Jun. 13, 2019

(51) Int. Cl.
*H04L 5/00* (2006.01)
*H04B 1/709* (2011.01)
*G01S 7/52* (2006.01)
*H04B 1/708* (2011.01)
*H04L 7/04* (2006.01)
*H04J 13/00* (2011.01)

(52) U.S. Cl.
CPC .......... *H04B 1/709* (2013.01); *G01S 7/52046* (2013.01); *H04B 1/708* (2013.01); *H04J 13/0014* (2013.01); *H04L 5/0023* (2013.01); *H04L 7/041* (2013.01)

(58) Field of Classification Search
CPC ..... H04B 1/709; H04B 1/708; H04J 13/0014; H04L 5/0023; H04L 7/041; G01S 7/52046
See application file for complete search history.

(56) References Cited

U.S. PATENT DOCUMENTS

| 5,376,939 | A  | * | 12/1994 | Urkowitz | G01S 7/42 342/134 |
| 2003/0179811 | A1 | * | 9/2003 | Fuente | H04B 1/707 375/130 |
| 2007/0242789 | A1 | * | 10/2007 | Jechoux | H04B 1/7077 375/365 |
| 2013/0147655 | A1 | * | 6/2013 | Kishigami | G01S 13/284 342/135 |

* cited by examiner

*Primary Examiner* — Dac V Ha
(74) *Attorney, Agent, or Firm* — Thien T. Nguyen

(57) ABSTRACT

Space-time-frequency multiplexing (STFM) schemes for radio frequency (RF) scanning are disclosed in which complementary pairs of sequences (or "Golay pairs") are transmitted at different times using multiple frequencies. The transmission and reception of the sequences can occur over multiple transmit (Tx) and/or receive (Rx) radio sectors to scan an entire area for range, azimuth, elevation, and (optionally) velocity of objects therein.

28 Claims, 7 Drawing Sheets

SPACE TIME FREQUENCY MULTIPLEXING (STFM) FOR RADAR SYSTEMS USING COMPLEMENTARY PAIR WAVEFORMS

BACKGROUND

Radar technology is used in various automotive applications and is considered as one of the key technologies for future autonomous driving systems. Because can work reliably in bad weather and lighting conditions providing accurate measurements of target range, velocity, and angle in multi-target scenarios, it can be a particularly useful source of data in automotive and other applications. However, the resolution and velocity requirements of future radar systems may be beyond the capabilities of the radar systems used in at least some current automotive applications.

BRIEF SUMMARY

Techniques described herein address these and other issues by utilizing space-time-frequency multiplexing (STFM) schemes in which complementary pairs of sequences (or "Golay pairs") are transmitted at different times using multiple frequencies. The transmission and reception of the sequences can occur over multiple transmit (Tx) and/or receive (Rx) radio sectors to scan an entire area for range, azimuth, elevation, and (optionally) velocity of objects therein.

An example method for radio frequency (RF) sensing using space-time-frequency multiplexing (STFM), according to the description, comprises performing a transmit sequence, where the transmit sequence comprises wirelessly transmitting, using a first frequency, a first sequence of a first complementary pair of sequences, then, subsequent to wirelessly transmitting the first sequence of the first complementary pair of sequences, wirelessly transmitting, using a second frequency, a first sequence of a second complementary pair of sequences. The transmit sequence further comprises, subsequent to wirelessly transmitting the first sequence of the second complementary pair of sequences, wirelessly transmitting, using the first frequency, a second sequence of the first complementary pair of sequences, and, subsequent to wirelessly transmitting the second sequence of the first complementary pair of sequences, wirelessly transmitting, using the second frequency, a second sequence of the second complementary pair of sequences. The method further comprises performing a receive sequence, where the receive sequence comprises receiving the first complementary pair of sequences, and receiving the second complementary pair of sequences. The method also comprises determining a distance of an object based on the received first complementary pair of sequences and the received second complementary pair of sequences.

An example radar system for performing radio frequency (RF) sensing using space-time-frequency multiplexing (STFM), according to the description, comprises transmit circuitry. The transmit circuitry is configured to perform a transmit sequence comprising wirelessly transmitting, using a first frequency, a first sequence of a first complementary pair of sequences, and subsequent to wirelessly transmitting the first sequence of the first complementary pair of sequences, wirelessly transmitting, using a second frequency, a first sequence of a second complementary pair of sequences. The transmit sequence further comprises subsequent to wirelessly transmitting the first sequence of the second complementary pair of sequences, wirelessly transmitting, using the first frequency, a second sequence of the first complementary pair of sequences, and subsequent to wirelessly transmitting the second sequence of the first complementary pair of sequences, wirelessly transmitting, using the second frequency, a second sequence of the second complementary pair of sequences. The radar system further comprises receive circuitry configured to perform a receive sequence comprising receiving the first complementary pair of sequences, and receiving the second complementary pair of sequences. The radar system also comprises processing circuitry communicatively coupled with the transmit circuitry and the receive circuitry, wherein the processing circuitry is configured to determine a distance of an object based on the received first complementary pair of sequences and the received second complementary pair of sequences.

An example device for radio frequency (RF) sensing using space-time-frequency multiplexing (STFM), according to the description, comprises means for performing a transmit sequence. The means for performing the transmit sequence comprise means for wirelessly transmitting, using a first frequency, a first sequence of a first complementary pair of sequences, and means for wirelessly transmitting, subsequent to wirelessly transmitting the first sequence of the first complementary pair of sequences, a first sequence of a second complementary pair of sequences using a second frequency. The means for performing the transmit sequence further comprise means for wirelessly transmitting, subsequent to wirelessly transmitting the first sequence of the second complementary pair of sequences, a second sequence of the first complementary pair of sequences using the first frequency, and means for wirelessly transmitting, subsequent to wirelessly transmitting the second sequence of the first complementary pair of sequences, a second sequence of the second complementary pair of sequences using the second frequency. The device further comprises means for performing a receive sequence comprising means for receiving the first complementary pair of sequences, and means for receiving the second complementary pair of sequences. The device also comprises means for determining a distance of an object based on the received first complementary pair and the received second complementary pair.

A non-transitory computer-readable medium, according to the description, has instructions stored thereby for performing radio frequency (RF) sensing using space-time-frequency multiplexing (STFM). The instructions, when executed by one or more processing units, cause the one or processing units to perform a transmit sequence comprising wirelessly transmitting, using a first frequency, a first sequence of a first complementary pair of sequences; wirelessly transmitting, subsequent to wirelessly transmitting the first sequence of the first complementary pair of sequences, a first sequence of a second complementary pair of sequences using a second frequency; wirelessly transmitting, subsequent to wirelessly transmitting the first sequence of the second complementary pair of sequences, a second sequence of the first complementary pair of sequences using the first frequency; and wirelessly transmitting, subsequent to wirelessly transmitting the second sequence of the first complementary pair of sequences, a second sequence of the second complementary pair of sequences using the second frequency. The instructions, when executed by one or more processing units, further cause the one or processing units to perform a receive sequence comprising receiving the first complementary pair of sequences, and receiving the second complementary pair of sequences. The instructions, when executed by one or more processing units, also cause the one or processing units to determine a distance of an object based on the received first complementary pair of sequences and the received second complementary pair of sequences.

Figure 1:
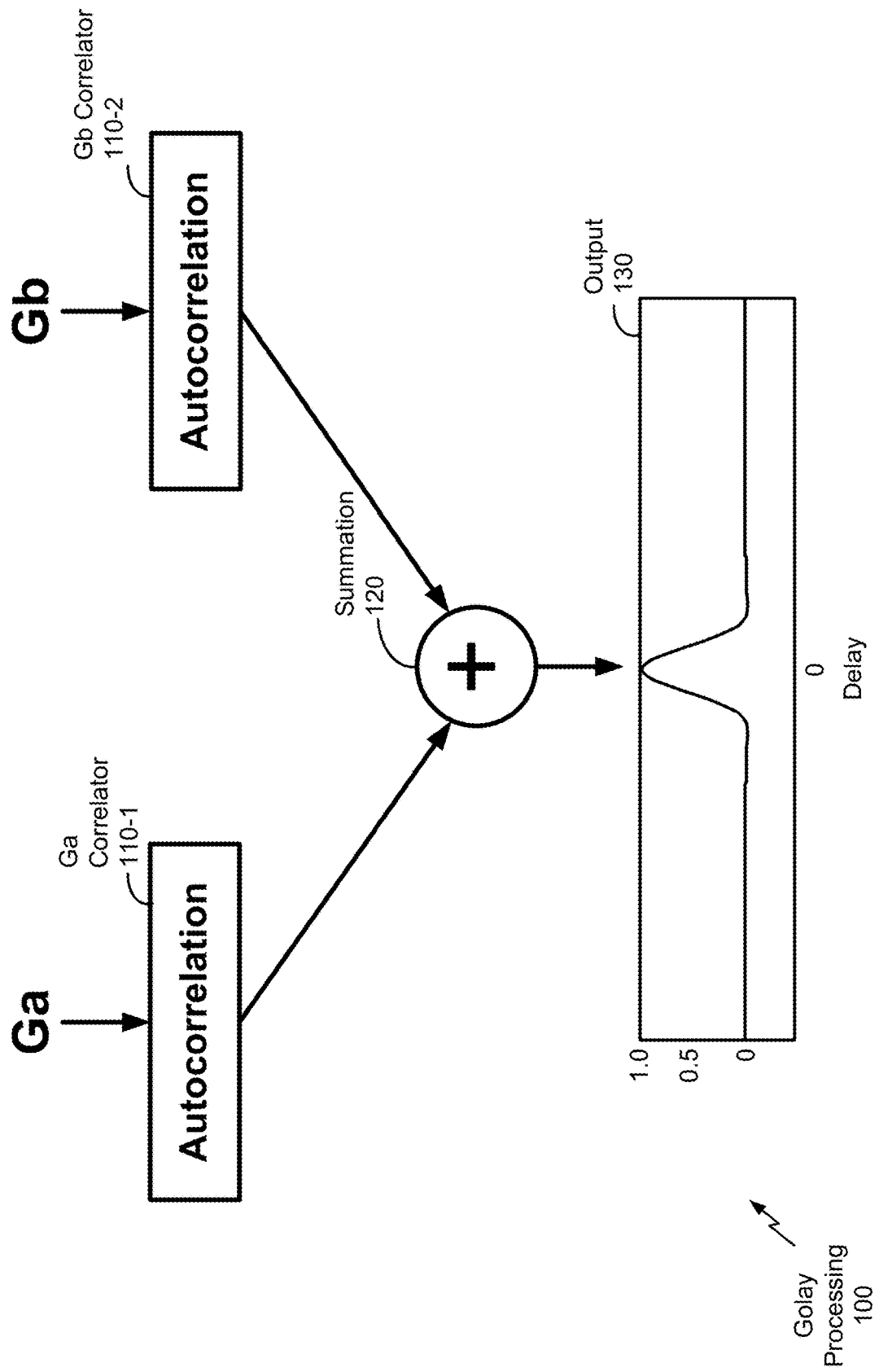
FIG. 1 is a block diagram of a Golay processing module, illustrating how complementary sequences can be processed to provide an impulse response with no side lobes.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative embodiments will now be described with respect to the accompanying drawings, which form a part hereof. The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

It can be further noted that, although embodiments described herein are described in the context of automotive applications, embodiments are not so limited. Embodiments may be used for other object-sensing applications (e.g., the sensing of location, distance, velocity, etc. of objects). Additionally, embodiments herein are generally directed toward the use of millimeter wave (mmWave) radar technology, which typically operates at 76-81 GHz, and may be operated more broadly from 30-300 GHz. That said, embodiments may utilize higher and/or lower RF frequencies depending on desired functionality, manufacturing concerns, and/or other factors.

As used herein, the terms "waveform," "sequence," and derivatives thereof are used interchangeably to refer to radio frequency (RF) signals generated by a transmitter of the radar system and received by a receiver of the radar system for object detection. A "pulse" and derivatives thereof are generally referred to herein as a complementary pair of sequences. Further, the terms "transmitter," "Tx," and derivatives thereof are used to describe components of a radar system used in the creation and/or transmission of RF signals. (As described in further detail below, this can include hardware and/or software components, such as processors, specialized circuitry, and one or more antennas.) Similarly, the terms "receiver," "Rx," and derivatives thereof are used to describe components of a radar system used in the receipt and/or processing of RF signals. (Again, this can include hardware and/or software components, such as processors, specialized circuitry, and one or more antennas.)

As noted, radar technology can be particularly useful in automotive applications due to reliability at bad weather and lighting conditions. However, fast development of autonomous driving technologies raises new requirements and motivates modern automotive radar systems to evolve from classical object detection sensors to ultra-high-resolution imaging devices with object recognition and classification capabilities. These future radar systems can, for example, provide autonomous vehicles with 4D radar images (images providing range, azimuth, elevation, and velocity of objects therein) at real-time refresh rate of 30 frames per second.

Typical specifications of automotive imaging radar include, for example, high range coverage of 300 meters, wide field of view (FOV) of 90 degrees and large range of velocities ±50 m/s along with high range resolution of 0.5 meters, and angular resolution of 1 degree and Doppler resolution of 0.5 m/s. To meet these very demanding requirements of automotive industry, next-generation radar systems are often equipped with very large transmit and receive antenna arrays of hundreds elements and use high bandwidth signals (~1 GHz), short pulse repletion interval of ~20 μs and long observation time of ~4 ms.

Today state-of-the-art radar sensors use chirp-sequence modulation pulses (e.g., frequency-modulated continuous-wave radar (FMCW)) and all digital Multiple-In Multiple-Out (MIMO) radar systems with multiple high-speed Analog-to-Digital Converters (ADCs) and Digital-to-Analog Converters (DACs) equipped with the capability of simultaneously transmitting different signals from each transmit antenna and simultaneously receiving at all receive antennas. However, this may require scaling up the existing MIMO radars from a few of transmitter/receiver (Tx/Rx) chains to tens or hundreds of Tx/Rx chains. This requires much more hardware, and this increase in hardware cost, as well as the complexity that comes with it, may make this approach practically undesirable.

Alternative more cost-effective techniques, such as analog phased-array beam-scanning, hybrid beamforming, and time-division multiplexing MIMO, use time multiplexing approach to significantly reduce complexity and number of Tx/Rx chains, at the expense of slower scan time. Unfortunately, chirp sequences are typically quite long (few tens of microseconds) and therefore time-multiplexing methods may not be able to meet the high Doppler resolution requirements (where movement is determined by sending multiple pulses in a single direction) and radar frame rate requirements. (A 90° FOV with a 1° resolution, for example, may require sending pulses in 90 different directions.)

Embodiments provided herein solve these and other issues by using much shorter complementary pair-based radar waveforms (e.g., ~1 μs) length and efficient space-time-frequency multiplexing. This provides for fast scanning of sectors, antennas, or subarrays, thus enabling more practical and cost-effective radar schemes with much lower number of Tx/Rx chains. In particular, short complementary pairs of phase-coded waveforms (for example, Golay complementary sequences) can be used along with time and frequency degrees of freedom for efficient multiplexing and fast scanning of different antennas and/or sectors in massive MIMO radar systems.

Figure 4:
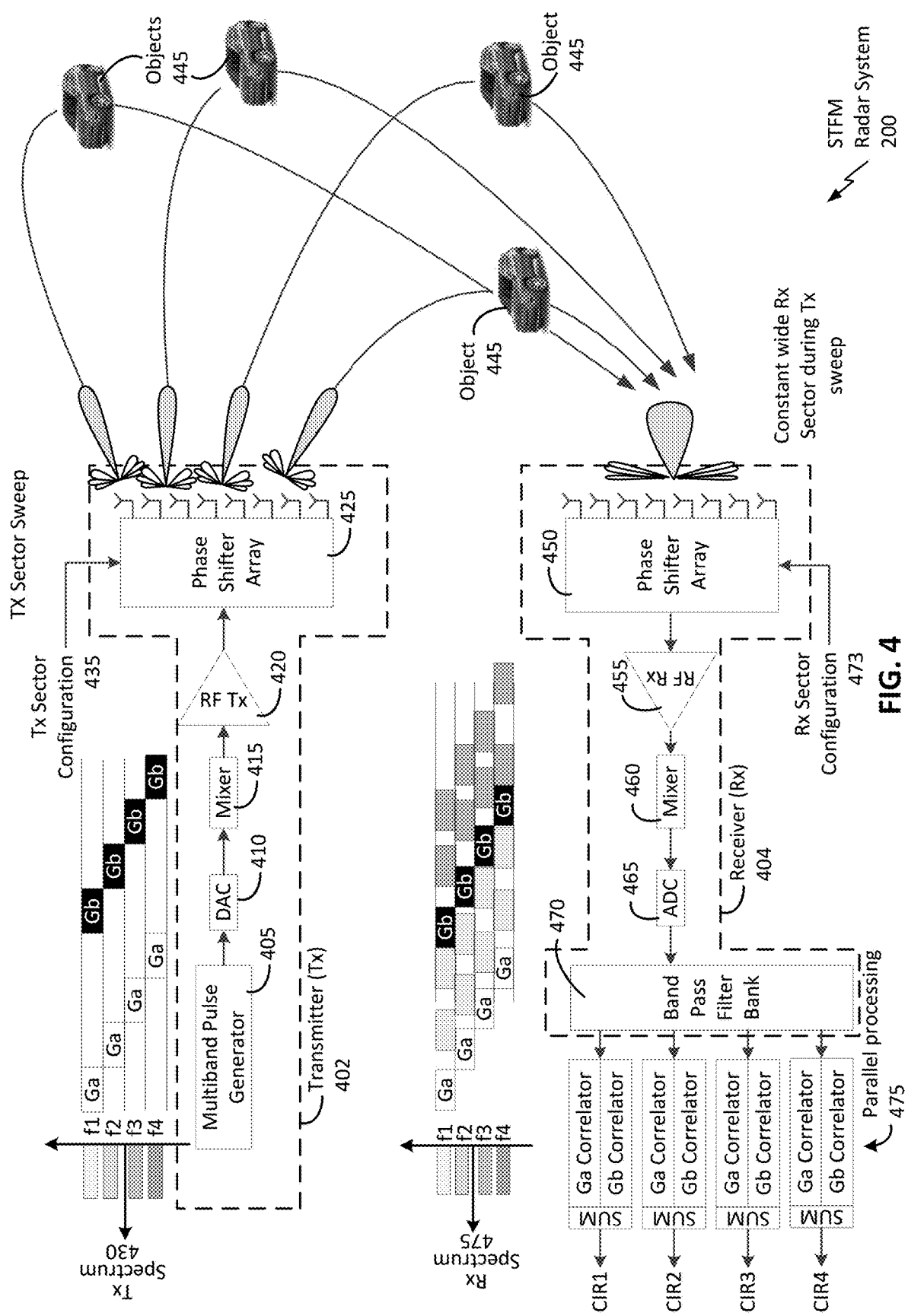
FIG. 4 is a block diagram of components of an STFM radar system capable of providing the functionality described herein, according to some embodiments.

An attractive property of complementary waveforms is that sum of their autocorrelation functions is equal to perfect impulse response function, thus enabling zero range side lobes. FIG. 1 is a block diagram of Golay processing 100, illustrating how Golay binary complementary sequences (also referred to herein as "Golay pairs" or "complementary pairs") can be processed by the receiver (Rx) of a radar system of to provide an impulse response with no side lobes. As will be appreciated by a person of ordinary skill in the art, Golay processing 100 is a form of digital signal processing that can be implemented by hardware and/or software at the receiver (Rx) of a radar system, as illustrated in FIG. 4, for example.

Here, a Golay pair comprises a first sequence, Ga, and a second sequence, Gb. Golay processing 100 comprises autocorrelating Ga and Gb sequences using Ga correlator 110-1 and Gb correlator 110-2, respectively. A summation 120 of the output of each correlator is then performed to provide output 130: a perfect pulse response with no side lobes. To exploit this complementary property for radar pulses, sequences Ga and Gb can be transmitted separately in time such that the time interval between these two transmissions is greater than a round-trip delay to the farthest object. Otherwise, cross-correlation between the long target echo of the first sequence and the second transmitted sequence will destroy zero side lobe property.

With this in mind, embodiments described herein can exploit this idle time between complementary sequences and send additional pairs of complementary sequences using orthogonal frequency sub-bands and different Tx antenna/sector configurations. This can result in efficient and fast scanning of Tx antenna/sectors with almost zero-overhead. Switching Tx antenna/sector configuration means the same Tx chains/DACs can be reused and/or connected to different antennas or analog sectors, thus reducing the number of required Tx chains/DACs.

Because the Rx side must wait round-trip delay to receive the longest echo before the Rx antenna/sector configuration can be changed, fast switching (similar to the Tx antenna/sector) may not be feasible with the Rx antenna/sector. That is, any switch of Rx antenna/sector has large penalty time equal to the round-trip delay to the farthest target (typically, maximal round-trip delay is longer than Golay pulse). Hence, according to many embodiments, switching of the Rx antenna/sector may be minimized. In some cases, for example, Rx antenna/sector may occur only as frequently as needed. That said, some embodiments may involve frequent switching of the Rx antenna/sector, due to other factors.

Figure 2:
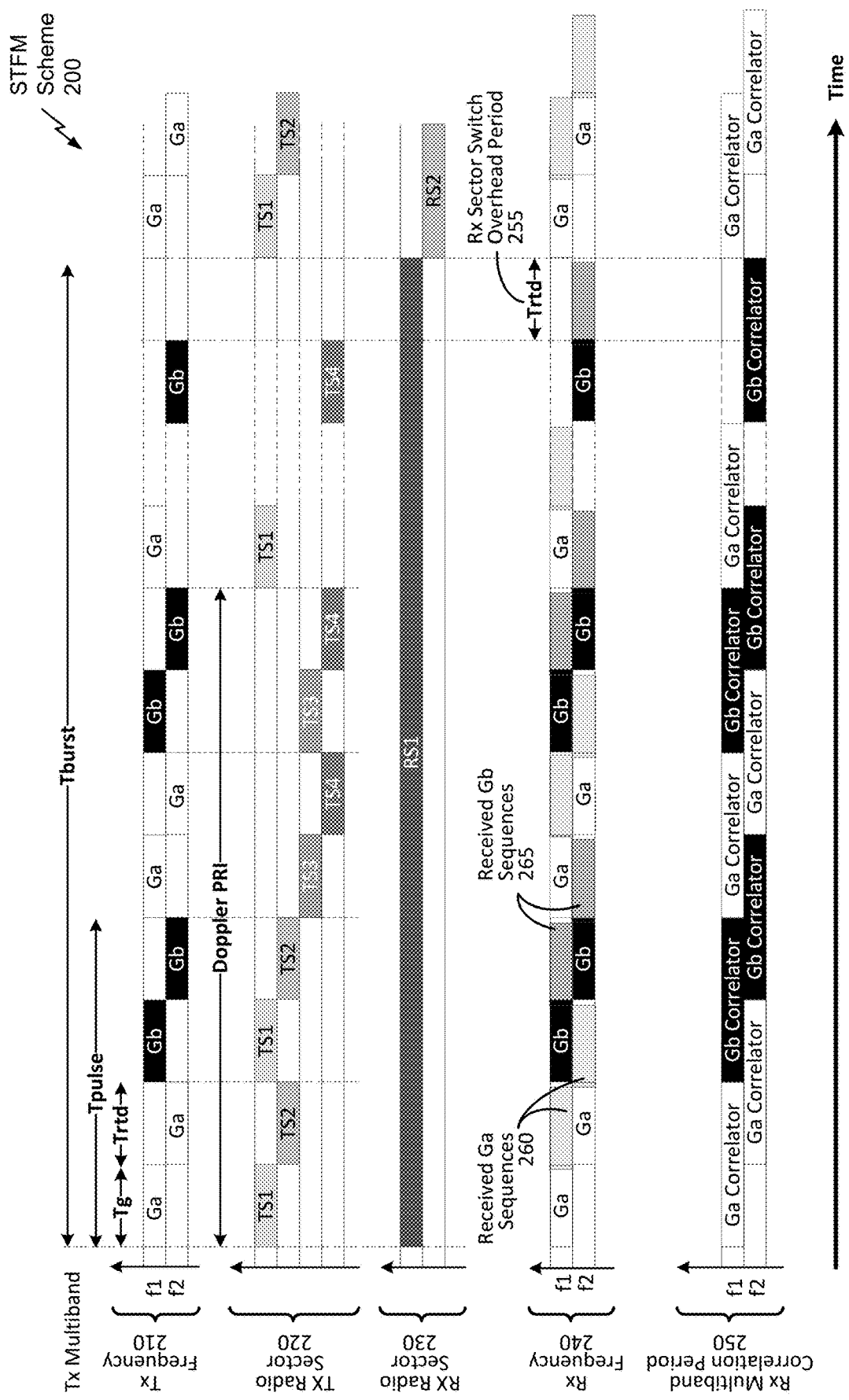
FIG. 2 is a diagram of a space-time-frequency multiplexing (STFM) scheme, according to a first embodiment.

FIG. 2 is a diagram of a space-time-frequency multiplexing (STFM) scheme 200, according to an embodiment. As shown, the horizontal axis represents time. The vertical axes represent Tx frequency 210, Tx radio sector 220, Rx radio sector 230, Rx frequency 240, and Rx multiband correlation period 250 (for each frequency). For the sake of this example, it can be assumed that an analog phased-array radar system is used to scan all Tx and Rx sectors to get a radar image. As will be appreciated, the amount of TX and/or RX sectors, which dictate the resolution of the output data, can vary depending on desired functionality.

In FIG. 2, the notations are as follows:

| | |
|---|---|
| Ga, Gb | - Golay pair sequences |
| Tg | - Single Golay sequence duration |
| Trtd | Round trip delay corresponding to the farthest object (defines minimum duration of an idle period between two complementary Golay pulses) |
| Tpulse | - Golay pair pulse interval (equal to the twice Golay duration and twice idle time) |
| Doppler PRI | - Pulse repetition interval of the same Tx/Rx sector for target velocity estimation |
| Tburst | - Burst interval (Burst is a sequence of pulses for velocity estimation) |
| TS | - Transmit Sector |
| RS | - Receive Sector |

Golay pair sequences Ga and Gb are transmitted as shown in the Tx frequency 210 graph. As can be seen, the idle time between Ga and Gb sequences, Trtd, may be approximately equal to the duration of the single Ga/Gb pulse to help maximize efficiency of the STFM scheme 200. (In alternative embodiments, however, this may not be the case.) Thus, two Golay pairs can be efficiently time-multiplexed, as illustrated, to scan two Tx sectors in one pulse duration, Tpulse. As shown by the Tx radio sector 220 graph, Tx sectors TS1 and TS2 are scanned in the first pulse duration, and Tx sectors TS3 and TS4 are scanned in the second pulse duration. Thus, one or more different antennas may be used during first and second pulse durations.

As also shown in the Tx frequency 210 graph, different Golay pairs are transmitted on the separated frequency sub-bands f1 and f2, two avoid cross-correlation interference between the two pairs at the Rx side. Here, the time-multiplexed pairs in Tx are not overlapping in time and do not need to be orthogonal to each other, but transmitted pulses may be reflected from multiple different targets and may therefore arrive at the receiver at overlapping times. Therefore, according to some embodiments, Ga and Gb of one pair may be orthogonal to both Ga and Gb of the second pair.

The transmission of Golay pairs in this orthogonal manner may be similar to real MIMO, where two orthogonal signals are simultaneously transmitted and then separated at the receiver side. In the STFM scheme 200, however, a single Tx chain may be used, along with time-interleaving, to transmit two different pulses and achieve the same MIMO effect at Rx side. The Rx side may then receive simultaneously (overlapped) two orthogonal signals and may therefore need to separate between them.

As previously noted, sectors may be scanned multiple times for Doppler determination (e.g., movement of any detected object). In some embodiments, for example, 100 to 200 pulses may be sent to a single direction for Doppler determination. (In other words, a Golay pair may be sent 100-200 times using the same Tx and Rx radio sectors, resulting in a Tburst time 100-200× longer than Tpulse.) In other embodiments, however, a larger or smaller amount of pulses may be sent. (Some embodiments may not require Doppler determination, and therefore may omit these repeated scans.) The frequency at which sectors are scanned can determine the maximal velocity that can be unambiguously estimated by the radar system. In the STFM scheme 200 of FIG. 2, the Doppler pulse repetition interval (PRI) is two times longer than Golay pair duration Tpulse. Therefore, additional two Golay pairs can be time-multiplexed and transmitted, thus sweeping four Tx sectors (TS1, TS2, TS3, and TS4) in single Doppler PRI. In contrast, in a typical case of FMCW automotive radar, only single pulse may be transmitted in a single Doppler PRI interval. Thus, the STFM scheme 200 illustrated in FIG. 2 results in beam scanning that is four times faster than typical FMCW automotive radar.

Continuing with the STFM scheme 200 illustrated in FIG. 2, the pattern of four Tx sectors multiplexing is repeated to scan all available Tx sectors while holding the same Rx sector. The amount of times each sector is scanned may vary, depending on desired functionality. As previously noted, some embodiments may only scan each sector a single time if Doppler determination is not needed. Other embodiments, including those that do provide Doppler determination, may scan each sector several times. The scanning of all of the Tx radio sectors (which, as previously indicated, may include transmitting/receiving multiple pulses in a single direction) is known as a "burst," and the time it takes to complete this burst is denoted in FIG. 2 as Tburst. (In some embodiments, Tburst may be 2 ms or 4 ms, for example. However, alternative embodiments may have longer or shorter Tburst periods.) The amounts of bursts required to conduct a sweep of the entire scanned area (e.g., a 90° FOV) may be dependent on factors such as the amount of Tx radio sectors scanned per burst and the amount of Tx and Rx radio sectors used to scan the area.

As noted previously, switching between Rx sectors has a certain overhead, Trtd, based on the round trip delay of the longest reflection path within the region scanned by the radar system. Thus, switching between Rx sectors can be minimized to reduce this overhead. In the STFM scheme 200, switching between Rx sectors occurs once all Tx sectors have been scanned. Once the Rx sector has been switched (e.g., from RS1 to RS2), the Tx sectors may be scanned in a similar manner. Furthermore, time can be allocated for the overhead of the switch between Rx sectors. That is, after transmission of the last pulse of the last Tx sector burst, an Rx sector switch overhead period 255 of length Trtd may be allocated as shown in FIG. 2 to wait to receive all echoes of the last transmitted sequence in the first before we can switch to the next Rx sector.

The graph of Rx frequency 240 shows received Ga sequences 260 and received Gb sequences 265 (juxtaposed with the transmitted sequences). (To avoid clutter, only a portion of the received Ga sequences 260 and received Gb sequences 265 are labeled.) Here, received Ga sequences 260 and Gb sequences 265 are delayed and attenuated. The amount of the delay is dependent on the distance of an object upon which the corresponding transmitted signal is reflected, and the amount of attenuation may be dependent on a variety of factors, including distance and composition of the object. As shown, the receipt of a sequence may begin prior to the completion of the transmittal of the sequence (again, based upon the distance of an object).

The graph of the Rx multiband correlation periods 250 illustrate how multiple correlators may be used to process the pulses received at different frequencies in parallel. That is, the GA correlator can operate during the period in which the sequence is transmitted, Tg, as well as the period, Trtd, allowing for the maximum round-trip delay. This can help ensure the detection of objects both far and near to the radar system. Once the period in which the Ga correlator is complete, the Gb correlator can then be used to detect the reflection of the transmission of the Gb sequence. As can be seen, the periods of operation for the Ga correlator and Gb correlator can be offset for each frequency (f1 and f2), corresponding to the offset of the Ga sequence and Gb sequence transmissions between the two frequencies.

This idea can easily be extended to more than two frequency bands using time-frequency multiplexing of more Golay pairs. One such example is illustrated in FIG. 3.

Figure 3:
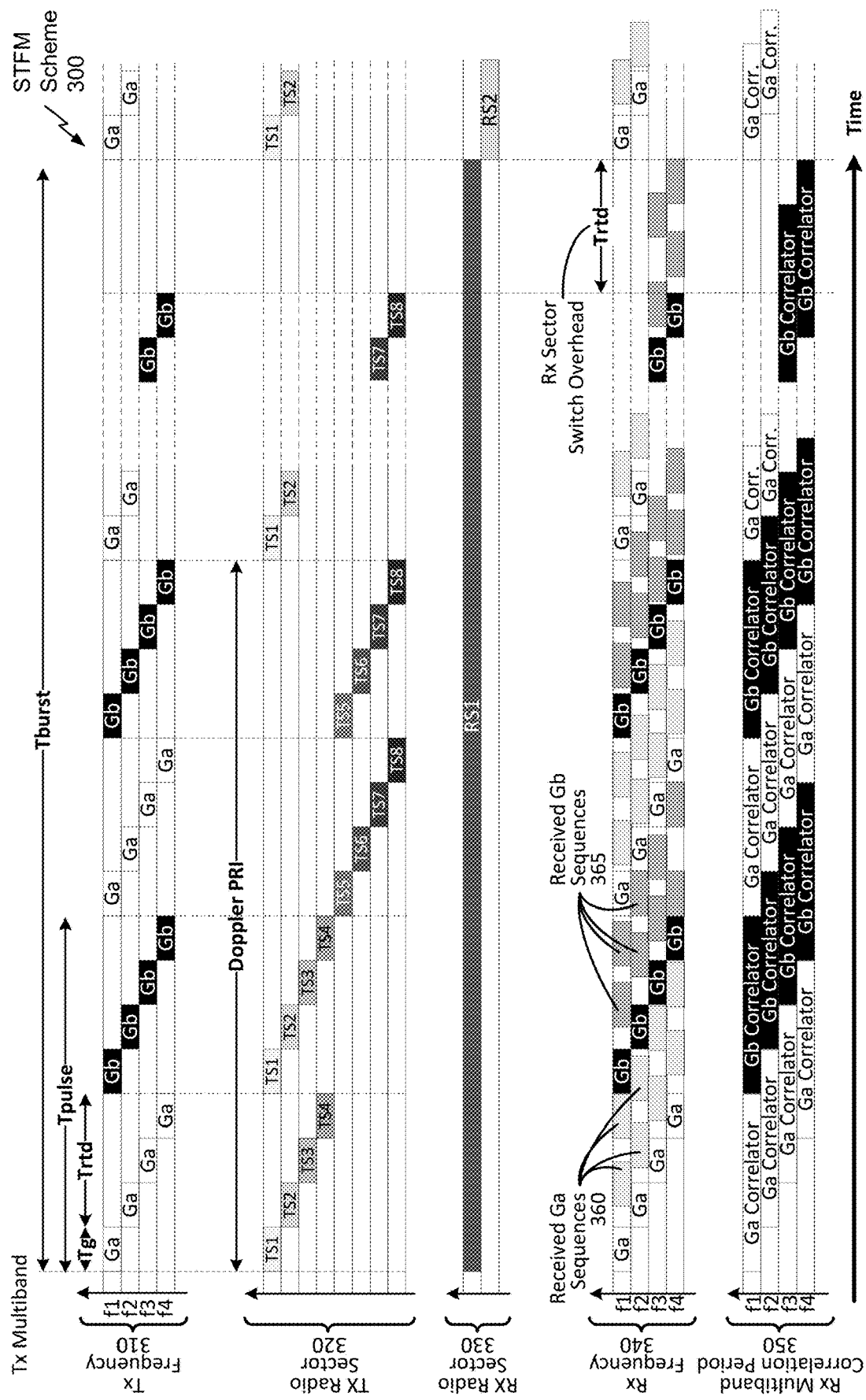
FIG. 3 is a diagram of an STFM scheme, according to a second embodiment.

FIG. 3 is a chart illustrating an STFM scheme 300 in which four-pulse multiplexing (i.e., the use of Golay pairs on four frequencies) is shown. Similar to FIG. 2, the horizontal axis represents time, and vertical axes represent Tx frequency 310, Tx radio sector 320, Rx radio sector 330, Rx frequency 340, and Rx multiband correlation period 350 (for each frequency). Here, however, the idle time, Trtd, between two transmitted complementary sequences Ga and Gb is approximately equal to three times of the single Ga/Gb sequence duration, Tg. Thus, four Golay pairs can be efficiently time-frequency-multiplexed to scan four Tx sectors (TS1-TS4) in one pulse duration, Tpulse, and eight Tx sectors in one Doppler PRI, thus the STFM scheme 300 can conduct a sweep of Tx radio sectors eight times faster than traditional FMCW automotive radar.

It can be noted here that four orthogonal frequency sub-bands (f1-f4) are used to achieve mutual orthogonality between Ga and Gb of all four Golay pairs. Using shorter pulses, additional frequencies, and/or shorter interval between Ga and Gb, additional beam scan acceleration can be attained. Although additional correlators may be needed at the Rx to perform parallel correlation, the Tx still only transmits one pulse of time. Thus, using many frequencies in an STFM scheme, such as the STFM scheme 300 of FIG. 3, may be a cost-effective solution in many embodiments.

In FIG. 3, received Ga sequences 360 and received Gb sequences 365 are shown in Rx frequency 340. (Again, only a portion of received Ga sequences 360 and received Gb sequences 365 are labeled, to avoid clutter.) Similar to received sequences in FIG. 2, these received sequences may overlap. As such, the processing of received signals at different frequencies, may be conducted in parallel. The parallel processing for the various Golay pairs at frequencies f1-f7 is shown in Rx multiband correlation period 350.

It can be noted that FIG. 3 (and subsequent figures) show multiple received Ga sequences 360 and received Gb sequences 365 corresponding to a single respective transmitted Ga or Gb sequence. This is to illustrate how there might be multiple reflected signals due to the transmitted signal reflecting off of multiple targets in the illuminated sector. (Although not illustrated in FIG. 2, this phenomenon may occur in that embodiment as well.) Moreover, reflected signals may overlap with each other and/or with the transmitted signal.

FIG. 4 is a block diagram of components of a STFM radar system 400 capable of providing the functionality described herein, according to some embodiments. The STFM radar system 400 comprises an analog phased-array radar with a single-chain/DAC transmitter 402 and a single-chain/ADC receiver 404, although alternative embodiments may use different types of phased-array radar, and may include multiple-chain/DAC transmitters and/or multiple-chain/ADC receivers, depending on desired functionality.

In the transmitter 402, a multiband pulse generator 405, DAC 410, mixer 415, RF Tx amplifier 420, and phase shifter array 425 operate to transmit Ga and Gb pulses in four frequencies, as shown in the Tx spectrum graph 430 (which is similar to the STFM scheme 300 of FIG. 3). More specifically, a time-frequency multiplexed signal may be digitally generated by the multiband pulse generator 405, converted to an analog signal using single wideband DAC 410, and then mixed to the RF frequency using the mixer 415.

Tx analog sector switching may be synchronized to the timing of pulses to implement a desired STFM scheme. This sector switching may be controlled using the input Tx sector configuration 445. A processing unit or other hardware and/or software components (not shown) may be used to provide an input to the Tx sector configuration 435, and may be communicatively coupled with the multiband pulse generator 405 and/or other components to help ensure synchronization of the Tx sector switching. Ultimately, the Tx chain (the multi-band pulse generator 405, DAC 410, mixer 415, RF Tx 420, and phase shifter array 425) in the embodiment illustrated in FIG. 4 operates to generate a beam scan pattern where four multiplexed sectors are scanned using four different frequency sub-bands (f1 44).

In FIG. 4, the RF signals generated by the scans reflect off objects 445 and are received at the phase shifter array 450. As illustrated in FIGS. 2 and 3, a single Rx sector can be used during the scan of multiple Tx sectors. Similarly, FIG. 4 illustrates a single Rx sector being used to receive the signals from the beam scan pattern of the four multiplexed Tx sectors.

The phase shifter array 450 works with an RF Rx amplifier 455, mixer 460, ADC 465, and band pass filter bank 470 to separate the received Golay pairs, as illustrated in the Rx spectrum graph 475. More specifically, the signal received at the phase shifter array 450 is amplified by the RF Rx amplifier 455, mixed down to the baseband using the mixer 460, and sampled using a single wideband ADC 465. Echoes of the four pulses may overlap because of different multi-target reflections at each Tx sector. Therefore, the Rx signal is passed through band pass filter bank for orthogonal signal separation. Similar to the phase shifter array 425 for the Tx, the configuration of the phase shifter array 450 of the Rx may be managed using an input for Rx sector configuration 473.

As illustrated, parallel processing 475 may occur on all four received pulses. That is, a different Golay correlators are simultaneously (in overlapped times) applied to pulses received a different frequencies to extract four correlator profiles, one for each of the four Tx sectors (e.g., as shown in the Rx multiband correlation period graph 350 of FIG. 3). As illustrated in FIG. 1, the sum of the autocorrelation of the Ga and Gb sequences (e.g., performed by a summation module) can result in a channel impulse response (CIR) for each of the four Tx sectors. As a person of skill in the art will appreciate, range (distance), azimuth, elevation, and/or velocity of one or more objects in the scanning area can then be determined based on channel impulse responses for Tx/Rx sectors.

The situation where Tx sectors are scanned while holding the same Rx sector can arise, for example, in analog phase-array radar where Tx is used for azimuth scan and Rx is used for elevation scan. An illustration of an embodiment of such an analog phase-array radar is shown in FIG. 5.

Figure 5:
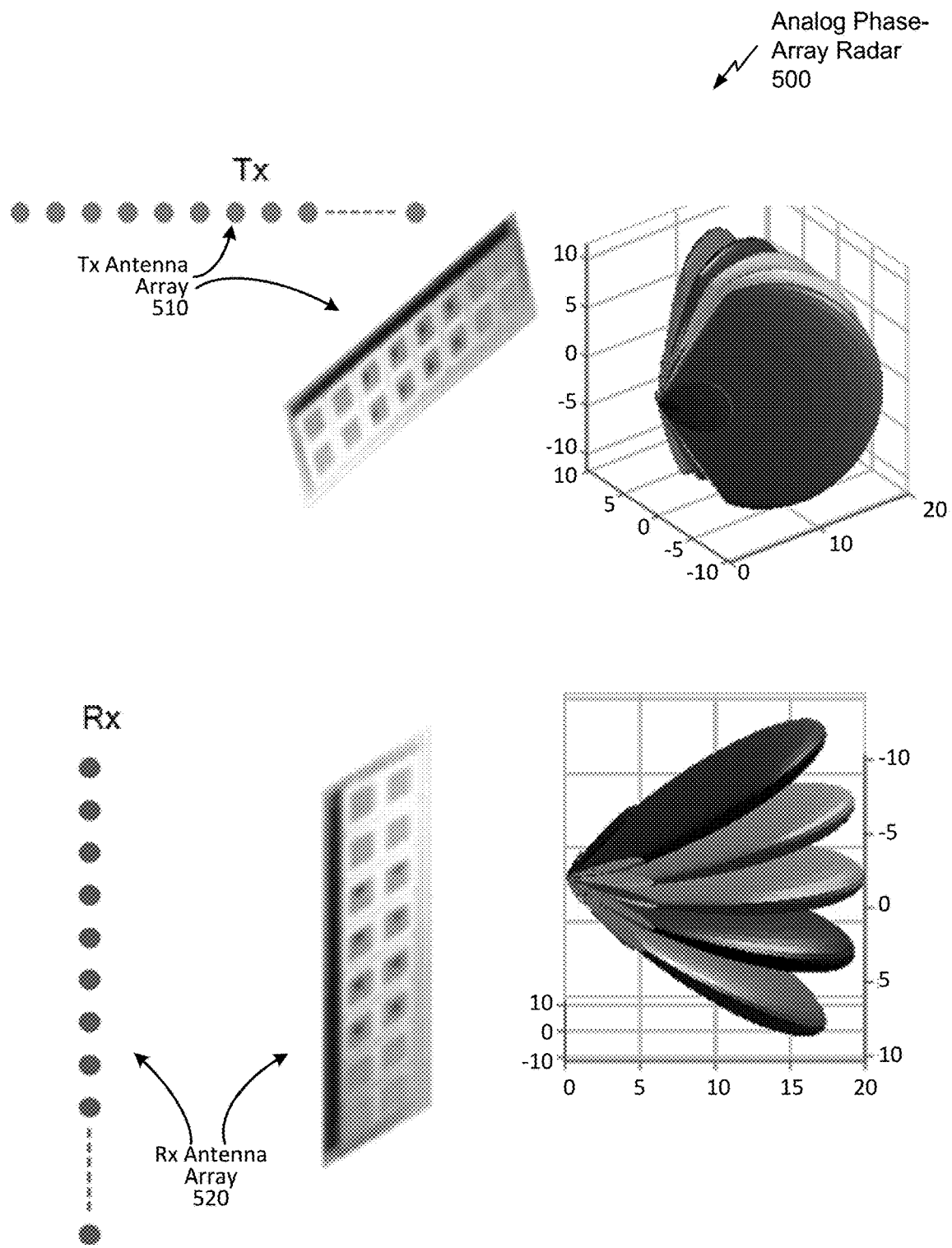
FIG. 5 is an illustration of an embodiment of an analog phase-array radar.

As illustrated in FIG. 5, this analog phase-array radar 500 comprises a horizontal Tx antenna array 510. (Examples of the TX antenna array 510 are shown in FIG. 5 as a single-row diagram, and a 2-row, 8-column array.) The analog phase-array radar 500 further comprises a vertical Rx antenna array 520. (Examples of the Rx antenna array 520 are shown in FIG. 5 as a single-column diagram, and an 8-row, 2-column array.) This arrangement provides for Tx sectors to be narrow in the azimuth direction and wide in the elevation direction. In contrast, Rx sectors are wide in the azimuth direction and narrow in the elevation direction. Thus, by holding the same Rx elevation sector (as shown in FIGS. 2-4), all Tx azimuth sectors can be scanned.

The proposed STFM approach can efficiently be used to accelerate radar scan in variety of Massive MIMO radar architectures where time multiplexing is applied in Tx to reduce hardware complexity of radar system. It includes analog phased-array, time-division multiplexing (TDM) MIMO, and variety of analog-digital hybrid beamforming (BF) schemes.

Figure 6:
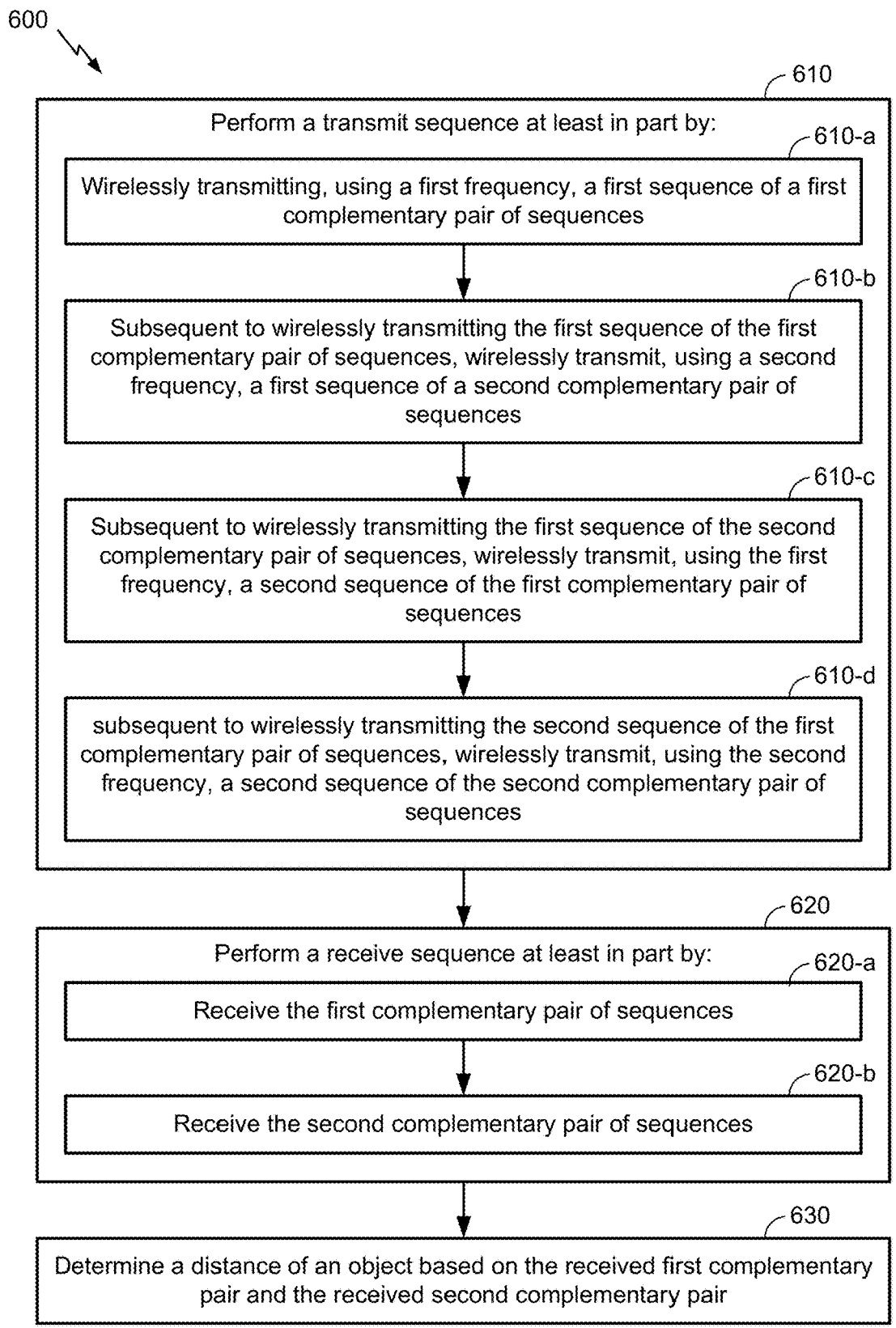
FIG. 6 is a flow diagram of a method of RF sensing object using STFM, according to an embodiment.

FIG. 6 is a flow diagram of a method 600 of RF sensing an object using STFM, according to an embodiment. The method 600 captures a portion of the functionality described in the embodiments above and illustrated in FIGS. 2-5. One or more of the functions described in the blocks illustrated in FIG. 6 may be performed by software and/or hardware components (e.g., a digital signal processor (DSP)) of an electronic device, such as the electronic device illustrated in FIG. 7 and described below, and/or one or more of the components illustrated in FIG. 4 (which may be incorporated into the electronic device illustrated in FIG. 7). Moreover, a person of ordinary skill in the art will appreciate that alternative embodiments may vary in the way they implement the functions illustrated in FIG. 6 by adding, omitting, combining, separating, and otherwise varying the functions illustrated in the blocks of FIG. 6.

At block 610, the functionality includes performing a transmit sequence at least in part by performing the functions described at blocks 610-*a* through 610-*d*. The functionality at block 610-*a* comprises wirelessly transmitting, using a first frequency, a first sequence of a first complementary pair of sequences. At block 610-*b*, the functionality comprises, subsequent to wirelessly transmitting the first sequence of the first complementary pair of sequences, wirelessly transmitting, using a second frequency, a first sequence of a second complementary pair of sequences. At block 610-*c*, the functionality comprises, subsequent to wirelessly transmitting the first sequence of the second complementary pair of sequences, wirelessly transmitting, using the first frequency, a second sequence of the first complementary pair of sequences. The functionality at block 610-*d* comprises, subsequent to wirelessly transmitting the second sequence of the first complementary pair of sequences, wirelessly transmitting, using the second frequency, a second sequence of the second complementary pair of sequences. As previously noted, complementary sequences, or Golay pairs, can provide an impulse response after each sequence is individually autocorrelated, and the resulting autocorrelations of each are subsequently summed with each other. This can be particularly useful for determining the range of an object. Moreover, because complementary sequences are relatively short (compared with FMCW scanning), embodiments may be able to transmit multiple Golay pairs (pulses) in a shorter time than it would take to complete a scan using FMCW radar. The time between the transmission of first and second sequences of each complementary pair may be based on a maximum round trip delay between the transmitter and an object at the maximum distance to be scanned.

Figure 7:
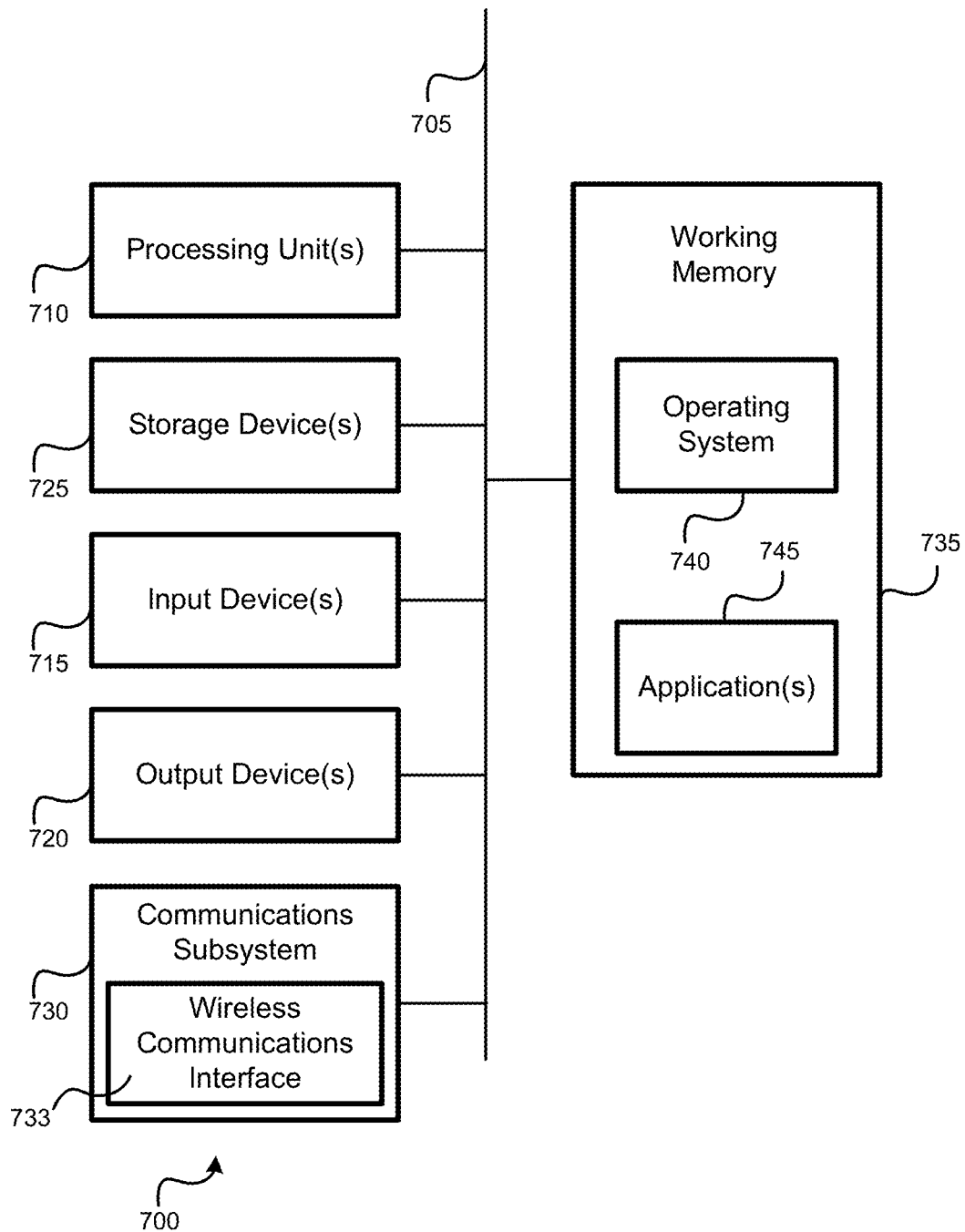
FIG. 7 is a block diagram of an embodiment of an electronic device.

Means for performing the functionality at block 610 may include, for example, a multiband pulse generator 405, DAC 410, mixer 415, RF Tx 420, phase shifter array 425, and one or more antennas, as illustrated in FIG. 4 and described above. Moreover, one or more of these components may be included in a communications subsystem 730 (including wireless communication interface 733), and/or other hardware and/or software components of an electronic device 700 as illustrated in FIG. 7 and described in further detail below.

The functionality of the embodiments may vary, as noted in the description above. Because complementary pairs are orthogonal, the first complementary pair of sequences may have the same values as the second complementary pair of sequences. (That is, the first complementary pair of sequences is the same as the second complementary pair of sequences, but transmitted orthogonally) first Additionally or alternatively, as noted in FIGS. 2-4, different complementary pairs of sequences may be used to scan different Tx sectors. That is, the first complementary pair of sequences may be transmitted in a first direction, and the second complementary pair of sequences may be transmitted in a second direction.

This can be extended to more than two directions. For example, as shown in FIG. 2 some embodiments may use two frequencies to scan in four directions. In this case, the functionality performing the transit sequence as shown in block 610 of FIG. 6 would further include wirelessly transmitting, in a third direction using the first frequency, a first sequence of a third complementary pair of sequences, and subsequent to wirelessly transmitting the first sequence of the third complementary pair of sequences, wirelessly transmitting, in a fourth direction using the second frequency, a first sequence of a fourth complementary pair of sequences. Performing the transit sequence would further include, subsequent to wirelessly transmitting the first sequence of the fourth complementary pair of sequences, wirelessly transmitting, in the third direction using the first frequency, a second sequence of the third complementary pair of sequences, and subsequent to wirelessly transmitting the second sequence of the third complementary pair of sequences, wirelessly transmitting, in the fourth direction using the second frequency, a second sequence of the fourth complementary pair of sequences.

Embodiments may also use more than two frequencies. For example, some embodiments, such as the embodiments shown in FIGS. 3-4, may use four frequencies to scan in four directions. In this case, the functionality performing the transit sequence as shown in block 610 of FIG. 6 would further include transmitting a third complementary pair of sequences using a third frequency, and transmitting a fourth complementary pair of sequences using a fourth frequency. As further indicated in the embodiments of FIGS. 3-4, wirelessly transmitting a first sequence of the third complementary pair of sequences and transmitting a first sequence of the fourth complementary pair sequences may occur subsequent to wirelessly transmitting the first sequence of the second complementary pair of sequences and prior to wirelessly transmitting the second sequence of the first complementary pair of sequences.

Referring again to FIG. 6, the method 600 further comprises, at block 620, performing a receive sequence at least in part by performing the functionality at block 620-*a* and 620-*a*. At block 620-*a*, the functionality includes receiving the first complementary pair of sequences, and at block 620-*b*, the functionality includes receiving the second complementary pair sequences.

Means for performing the functionality at block 620 may include, for example, one or more antennas, a phase shifter array 450, RF Rx 455, mixer 460, ADC 465, band pass filter bank 470, and parallel processing 475 as illustrated in FIG. 4 and described above. Moreover, one or more of these components may be included in a communications subsystem 730 (including wireless communication interface 733), and/or other hardware and/or software components of an electronic device 700 as illustrated in FIG. 7 and described in further detail below.

At block 630, the functionality comprises determining a distance of an object based on the received first complementary pair and the received second complementary pair. As noted in the embodiments above, the distance can be determined based on a time at which either or both of the first and second complementary pairs are transmitted and received (e.g., a calculated round-trip time). The times at which pulses are received can be determined by the impulse response generated as shown in FIG. 1, by autocorrelating each sequence in the pair, then summing the autocorrelations of both sequences in the pair. Determining the impulse response for each pair can be done with parallel processing 475, as shown in FIG. 4. This can be implemented in hardware and/or software. As such, means for performing the functionality at block 630 may include, for example, a module configured to perform the parallel processing 475 of FIG. 4, as described above. This module can be implemented in hardware (e.g., specialize circuitry) and/or software (e.g., executed by a processing unit), which may be included in a communications subsystem 730 (including wireless communication interface 733), processing unit(s) 710, and/or other hardware and/or software components of an electronic device 700 as illustrated in FIG. 7 and described in further detail below.

As noted previously herein and shown in FIG. 4, embodiments provide for the use of a single Tx and/or Rx chain. This can be particularly helpful in making low-cost RF sensing circuitry capable of implementing the STFM schemes detailed herein. Accordingly, the transmit sequence of block 610 may be performed with transmit circuitry having a single DAC. Additionally or alternatively, the receive sequence of block 620 may be performed by receive circuitry having a single ADC. Other embodiments, however, may utilize multiple Tx and/or Rx chains.

Some embodiments may allow for the determination of Doppler information for detected objects by sending multiple pulses in a single direction (each pulse comprising the transmission of a complementary pair of sequences). Thus, the method 600 may further comprise performing the transmit sequence and the receive sequence a plurality of times in succession. In some embodiments, multiple Tx sectors may be scanned during each transmit sequence. The Doppler PRI in such instances may be based on the total amount of time required to transmit pulses in each of the directions.

FIG. 7 illustrates an embodiment of an electronic device 700, which may be capable of performing the RF sensing using STFM as described in the embodiments above, including one or more functions of the method described in FIG. 6. As previously noted, components illustrated in FIG. 4 may be incorporated into one or more of the hardware elements of the electronic device 700, such as the communications sub system 730.

It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner. In addition, it can be noted that components illustrated by FIG. 7 can be localized to a single device and/or distributed among various networked devices, which may be disposed at different physical locations (e.g., different locations in an automobile). For automotive applications, the electronic device 700 may comprise an automobile's on-board computer.

The electronic device 700 is shown comprising hardware elements that can be electrically coupled via a bus 705 (or may otherwise be in communication, as appropriate). The hardware elements may include processing unit(s) 710, which can include without limitation one or more general-purpose processors, one or more special-purpose processors (such as a Digital Signal Processor (DSP), Graphics Processing Unit (GPU), Application-Specific Integrated Circuit (ASIC), Field Programmable Gate Array (FPGA), and/or the like), and/or other processing structure, which may be configured to perform one or more of the functions in the methods described herein, including the method illustrated in FIG. 6. The electronic device 700 also can include one or more input devices 715, which can include without limitation a touchscreen display or other user interface, one or more automation systems for an automated vehicle, and/or the like; and one or more output devices 720, which can include without limitation a display device, the one or more automation systems for an automated vehicle, and/or the like.

The electronic device 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The electronic device 700 may also include a communications subsystem 730, which can include support of wireline communication technologies and/or wireless communication technologies (in some embodiments) managed and controlled by a wireless communication interface 733. The communications sub system 730 may include a modem, a network card (wireless or wired), an infrared communication device, a wireless communication device, and/or a chipset, and/or the like. The communications subsystem 730 may include one or more input and/or output communication interfaces, such as the wireless communication interface 733, to permit data and signaling to be exchanged with a network, mobile devices, other computer systems, and/or any other electronic devices described herein. As previously noted, and one or more of the components illustrated in FIG. 4 may be incorporated into a wireless communications interface 733 capable of both RF sensing in accordance with the embodiments provided herein, as well as communication. In other embodiments, components illustrated in FIG. 4 may comprise or be incorporated into a dedicated sensing unit, which may be used as an input device 715.

In many embodiments, the electronic device 700 further comprises a working memory 735, which can include a RAM and/or or ROM device. Software elements, shown as being located within the working memory 735, can include an operating system 740, device drivers, executable libraries, and/or other code, such as application(s) 745, which may comprise computer programs provided by various embodiments, and/or may be designed to implement methods, and/or configure systems, provided by other embodiments, as described herein. Merely by way of example, one or more functions described with respect to the methods discussed above, such as the method described in relation to FIG. 6, may be implemented as code and/or instructions that are stored (e.g., temporarily) in working memory 735 and are executable by a computer (and/or a processing unit within a computer, such as processing unit(s) 710); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 725 described above. In some cases, the storage medium might be incorporated within a computer system, such as electronic device 700. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the electronic device 700 and/or might take the form of source and/or installable code, which, upon compilation and/or installation on the electronic device 700 (e.g., using any of a variety of generally available compilers, installation programs, compression/decompression utilities, etc.), then takes the form of executable code.

It can be noted that, although particular frequencies, hardware, and other features may have been in the embodiments provided herein, alternative embodiments may vary. That is, alternative embodiments may utilize additional or alternative frequencies, antenna elements (e.g., having different size/shape of antenna element arrays), frame rates, electronic devices, and/or other features as described in the embodiments herein. A person of ordinary skill in the art will appreciate such variations.

A person of ordinary skill in the art will additionally appreciate that various aspects of the embodiments described herein may be implemented in various ways. For example, pulse generation, correlation, and/or other types of signal generation and/or processing might be implemented in hardware, software (e.g., firmware), or both. Further, hardware and/or software functions may be distributed among different components and/or devices.

Embodiments provided herein may be used for automated driving and/or other applications. Generally speaking, the architecture illustrated in FIG. 4 may be incorporated into any of a variety of different types of computing devices and/or systems. These devices/systems may generally include a processing unit (which can include, for example, a general-purpose processor, special-purpose processor (such as digital signal processing (DSP) chip, graphics acceleration processor, application specific integrated circuit (ASIC), and/or the like), and/or other processing structure or means); input device(s) (which can include, for example, a keyboard, touch screen, a touch pad, microphone, button, dial, switch, and/or the like); output device(s) (which can include, for example, a display, light emitting diode (LED), audio speaker, and/or the like); a communication bus communicatively coupling the various components of the electronic devices together; a communication interface; and the like.

The aforementioned memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, RAM, PROM, EPROM, a FLASH-EPROM, any other memory chip or cartridge, and/or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this description, terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical, electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method for radio frequency (RF) sensing using space-time-frequency multiplexing (STFM):
   performing a transmit sequence comprising:
      wirelessly transmitting, using a first frequency, a first sequence of a first complementary pair of sequences;
      subsequent to wirelessly transmitting the first sequence of the first complementary pair of sequences, wirelessly transmitting, using a second frequency, a first sequence of a second complementary pair of sequences;
      subsequent to wirelessly transmitting the first sequence of the second complementary pair of sequences, wirelessly transmitting, using the first frequency, a second sequence of the first complementary pair of sequences; and
      subsequent to wirelessly transmitting the second sequence of the first complementary pair of sequences, wirelessly transmitting, using the second frequency, a second sequence of the second complementary pair of sequences;
   performing a receive sequence comprising:
      receiving the first complementary pair of sequences, and
      receiving the second complementary pair of sequences; and
   determining a distance of an object based on the received first complementary pair of sequences and the received second complementary pair of sequences.

2. The method of claim 1, wherein the first complementary pair of sequences is the same as the second complementary pair of sequences.

3. The method of claim 1, wherein the first complementary pair of sequences is wirelessly transmitted in a first direction, and the second complementary pair of sequences is wirelessly transmitted in a second direction.

4. The method of claim 3, further comprising performing the transmit sequence and receive sequence a plurality of times in succession.

5. The method of claim 3, wherein performing the transmit sequence further comprises:
   wirelessly transmitting, in a third direction using the first frequency, a first sequence of a third complementary pair of sequences;
   subsequent to wirelessly transmitting the first sequence of the third complementary pair of sequences, wirelessly transmitting, in a fourth direction using the second frequency, a first sequence of a fourth complementary pair of sequences;
   subsequent to wirelessly transmitting the first sequence of the fourth complementary pair of sequences, wirelessly transmitting, in the third direction using the first frequency, a second sequence of the third complementary pair of sequences; and
   subsequent to wirelessly transmitting the second sequence of the third complementary pair of sequences, wirelessly transmitting, in the fourth direction using the second frequency, a second sequence of the fourth complementary pair of sequences.

6. The method of claim 3, wherein performing the transmit sequence further comprises:
   wirelessly transmitting a third complementary pair of sequences using a third frequency, and
   wirelessly transmitting a fourth complementary pair of sequences using a fourth frequency; and
   wherein wirelessly transmitting a first sequence of the third complementary pair of sequences and wirelessly transmitting a first sequence of the fourth complementary pair sequences occurs subsequent to wirelessly transmitting the first sequence of the second complementary pair of sequences and prior to wirelessly transmitting the second sequence of the first complementary pair of sequences.

7. The method of claim 1, wherein the transmit sequence is performed with transmit circuitry having a single Digital-to-Analog Converter (DAC).

8. The method of claim 1, wherein the receive sequence is performed with a receive circuitry having a single Analog-to-Digital Converter (ADC).

9. A radar system for performing radio frequency (RF) sensing using space-time-frequency multiplexing (STFM):
   transmit circuitry configured to perform a transmit sequence comprising:
      wirelessly transmitting, using a first frequency, a first sequence of a first complementary pair of sequences;
      subsequent to wirelessly transmitting the first sequence of the first complementary pair of sequences, wirelessly transmitting, using a second frequency, a first sequence of a second complementary pair of sequences;
      subsequent to wirelessly transmitting the first sequence of the second complementary pair of sequences, wirelessly transmitting, using the first frequency, a second sequence of the first complementary pair of sequences; and
      subsequent to wirelessly transmitting the second sequence of the first complementary pair of sequences, wirelessly transmitting, using the second frequency, a second sequence of the second complementary pair of sequences;
   receive circuitry configured to perform a receive sequence comprising:
      receiving the first complementary pair of sequences, and
      receiving the second complementary pair of sequences; and
   processing circuitry communicatively coupled with the transmit circuitry and the receive circuitry, wherein the processing circuitry is configured to determine a distance of an object based on the received first complementary pair of sequences and the received second complementary pair of sequences.

10. The radar system of claim 9, wherein the transmit circuitry comprises a multiband pulse generator, a digital-to-analog converter (DAC), a mixer, an amplifier, a phase shift array, and one or more antennas.

11. The radar system of claim 9, wherein the transmit circuitry is further configured to:
   wirelessly transmit the first complementary pair of sequences in a first direction, and
   wirelessly transmit the second complementary pair of sequences in a second direction.

12. The radar system of claim 11, wherein the transmit circuitry and the receive circuitry are configured to perform the transmit sequence and receive sequence a plurality of times in succession.

13. The radar system of claim 11, wherein the transmit circuitry is further configured to:
   wirelessly transmit, in a third direction using the first frequency, a first sequence of a third complementary pair of sequences;
   wirelessly transmit, subsequent to wirelessly transmitting the first sequence of the third complementary pair of sequences, a first sequence of a fourth complementary pair of sequences in a fourth direction using the second frequency;
   wirelessly transmit, subsequent to wirelessly transmitting the first sequence of the fourth complementary pair of sequences, a second sequence of the third complementary pair of sequences in the third direction using the first frequency; and
   wirelessly transmit, subsequent to wirelessly transmit the second sequence of the third complementary pair of sequences, a second sequence of the fourth complementary pair of sequences in the fourth direction using the second frequency.

14. A radar system of claim 11, wherein the transmit circuitry is further configured to:
   transmit a third complementary pair of sequences using a third frequency, and
   transmit a fourth complementary pair of sequences using a fourth frequency; and
   wherein, the transmit circuitry is further configured to wirelessly transmit a first sequence of the third complementary pair of sequences and to wirelessly transmit a first sequence of the fourth complementary pair sequences subsequent to wirelessly transmitting the first sequence of the second complementary pair of sequences and prior to wirelessly transmitting the second sequence of the first complementary pair of sequences.

15. A radar system of claim 10, wherein the receive circuitry comprises one or more antennas, a phase shifter array, an amplifier, a mixer, an analog-to-digital converter (ADC), and a band pass filter bank.

16. A radar system of claim 15, wherein processing circuitry comprises:
   a correlator for each sequence of the first complementary pair of sequences and each sequence of the second complementary pair of sequences,
   a summation module for each of the first complementary pair of sequences and the second complementary pair of sequences, and
   a processing unit.

17. A device for radio frequency (RF) sensing using space-time-frequency multiplexing (STFM):
   means for performing a transmit sequence comprising:
      means for wirelessly transmitting, using a first frequency, a first sequence of a first complementary pair of sequences;
      means for wirelessly transmitting, subsequent to wirelessly transmitting the first sequence of the first complementary pair of sequences, a first sequence of a second complementary pair of sequences using a second frequency;
      means for wirelessly transmitting, subsequent to wirelessly transmitting the first sequence of the second complementary pair of sequences, a second sequence of the first complementary pair of sequences using the first frequency; and
      means for wirelessly transmitting, subsequent to wirelessly transmitting the second sequence of the first complementary pair of sequences, a second sequence of the second complementary pair of sequences using the second frequency;
   means for performing a receive sequence comprising:
      means for receiving the first complementary pair of sequences, and
      means for receiving the second complementary pair of sequences; and
   means for determining a distance of an object based on the received first complementary pair and the received second complementary pair.

18. The device of claim 17, further comprising means for wirelessly transmitting the first complementary pair of sequences in a first direction, and means for wirelessly transmitting the second complementary pair of sequences in a second direction.

19. The device of claim 18, further comprising means for causing the device to perform the transmit sequence and receive sequence a plurality of times in succession.

20. The device of claim 18, further comprising:
means for wirelessly transmitting a first sequence of a third complementary pair of sequences in a third direction using the first frequency;
means for wirelessly transmitting a first sequence of a fourth complementary pair of sequences in a fourth direction using the second frequency, subsequent to wirelessly transmitting the first sequence of the third complementary pair of sequences;
means for wirelessly transmitting a second sequence of the third complementary pair of sequences in the third direction using the first frequency, subsequent to wirelessly transmitting the first sequence of the fourth complementary pair of sequences; and
means for wirelessly transmitting a second sequence of the fourth complementary pair of sequences in the fourth direction using the second frequency, subsequent to wirelessly transmitting the second sequence of the third complementary pair of sequences.

21. The device of claim 18, further comprising:
means for wirelessly transmitting a third complementary pair of sequences using a third frequency and wirelessly transmitting a fourth complementary pair of sequences using a fourth frequency, such that a first sequence of the third complementary pair of sequences and a first sequence of the fourth complementary pair sequences are wirelessly transmitted subsequent to wirelessly transmitting the first sequence of the second complementary pair of sequences and prior to wirelessly transmitting the second sequence of the first complementary pair of sequences.

22. The device of claim 17, wherein the means for performing the transmit sequence comprises a single Digital-to-Analog Converter (DAC).

23. The device of claim 17, wherein the means for performing a receive sequence comprises a single Analog-to-Digital Converter (ADC).

24. A non-transitory computer-readable medium having instructions stored thereby for performing radio frequency (RF) sensing using space-time-frequency multiplexing (STFM), wherein the instructions, when executed by one or more processing units, cause the one or processing units to:
perform a transmit sequence comprising:
wirelessly transmitting, using a first frequency, a first sequence of a first complementary pair of sequences;
wirelessly transmitting, subsequent to wirelessly transmitting the first sequence of the first complementary pair of sequences, a first sequence of a second complementary pair of sequences using a second frequency;
wirelessly transmitting, subsequent to wirelessly transmitting the first sequence of the second complementary pair of sequences, a second sequence of the first complementary pair of sequences using the first frequency; and
wirelessly transmitting, subsequent to wirelessly transmitting the second sequence of the first complementary pair of sequences, a second sequence of the second complementary pair of sequences using the second frequency;
perform a receive sequence comprising:
receiving the first complementary pair of sequences, and
receiving the second complementary pair of sequences; and
determine a distance of an object based on the received first complementary pair of sequences and the received second complementary pair of sequences.

25. The non-transitory computer-readable medium of claim 24, wherein the instructions further comprise instructions for causing the one or processing units to wirelessly transmit the first complementary pair of sequences in a first direction, and wirelessly transmit the second complementary pair of sequences in a second direction.

26. The non-transitory computer-readable medium of claim 25, wherein the instructions further comprise instructions for causing the one or processing units to perform the transmit sequence and receive sequence a plurality of times in succession.

27. The non-transitory computer-readable medium of claim 25, wherein the instructions further comprise instructions for causing the one or processing units to:
wirelessly transmit a first sequence of a third complementary pair of sequences in a third direction using the first frequency;
wirelessly transmit a first sequence of a fourth complementary pair of sequences in a fourth direction using the second frequency, subsequent to wirelessly transmitting the first sequence of the third complementary pair of sequences;
wirelessly transmit a second sequence of the third complementary pair of sequences in the third direction using the first frequency, subsequent to wirelessly transmitting the first sequence of the fourth complementary pair of sequences; and
wirelessly transmit a second sequence of the fourth complementary pair of sequences in the fourth direction using the second frequency, subsequent to wirelessly transmitting the second sequence of the third complementary pair of sequences.

28. The non-transitory computer-readable medium of claim 25, wherein the instructions further comprise instructions for causing the one or processing units to:
wirelessly transmit a third complementary pair of sequences using a third frequency and wirelessly transmit a fourth complementary pair of sequences using a fourth frequency, such that a first sequence of the third complementary pair of sequences and a first sequence of the fourth complementary pair sequences are wirelessly transmitted subsequent to wirelessly transmitting the first sequence of the second complementary pair of sequences and prior to wirelessly transmitting the second sequence of the first complementary pair of sequences.

* * * * *